Figure 6:
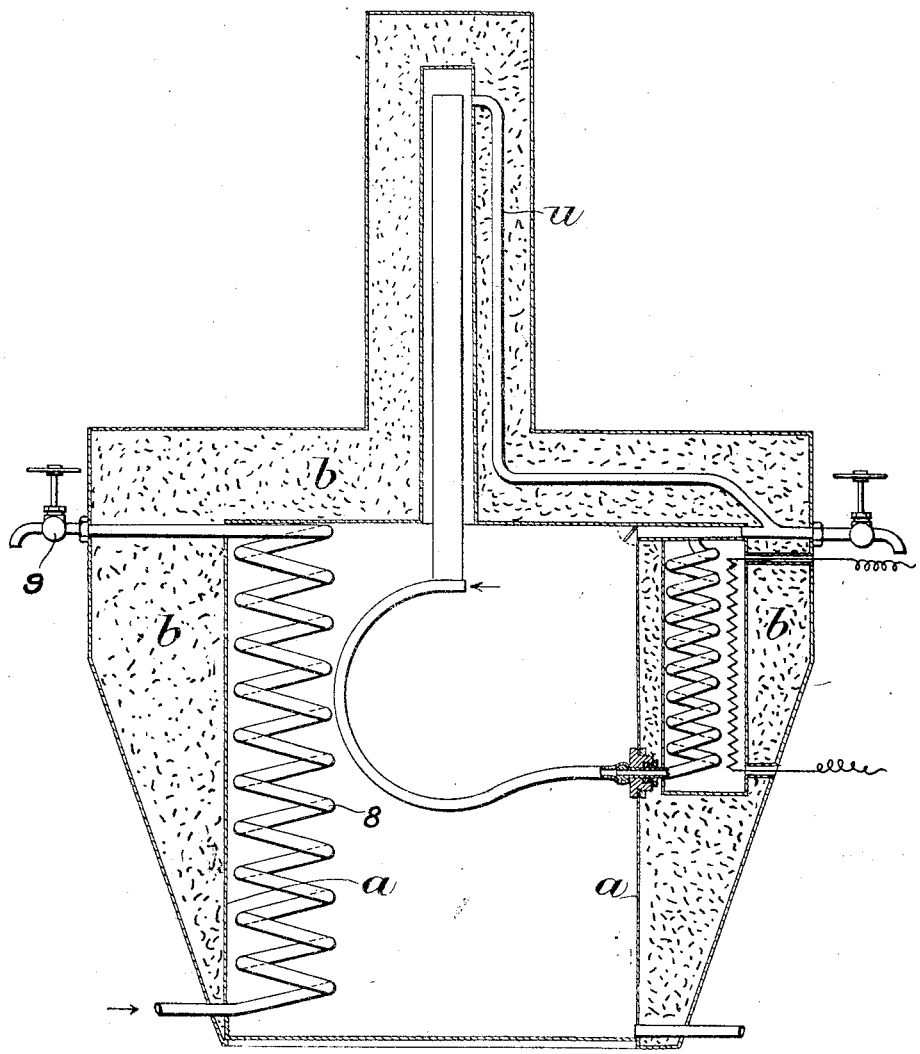

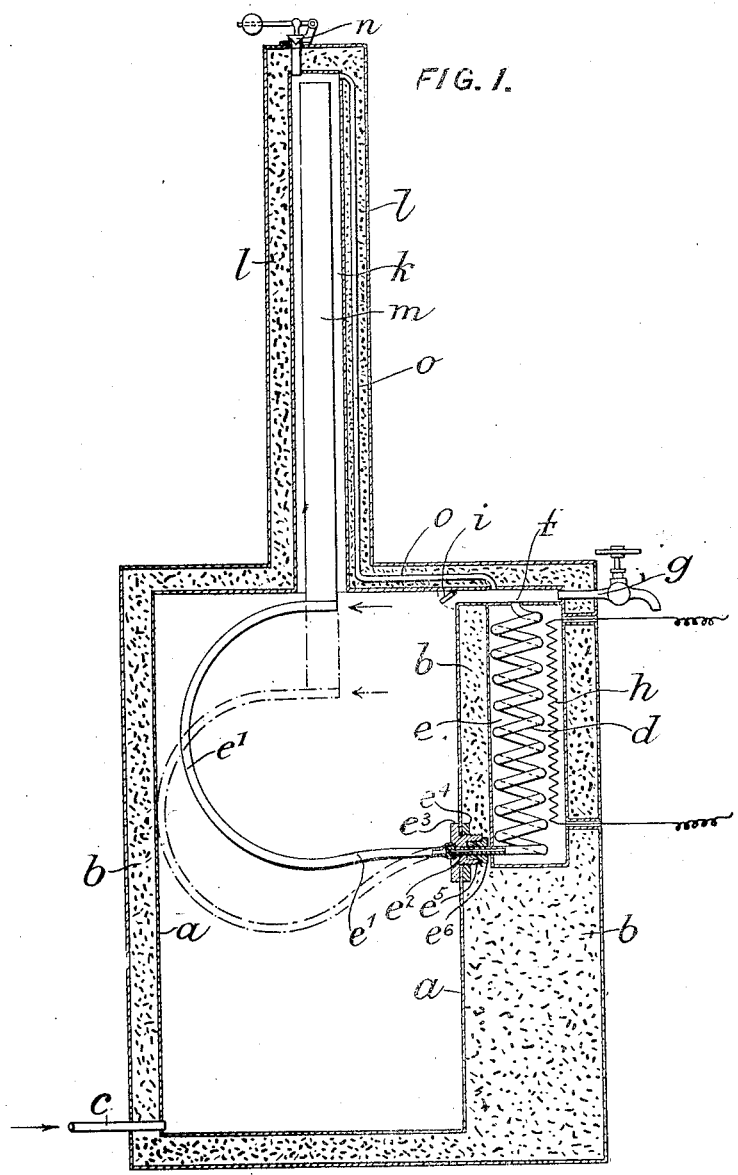

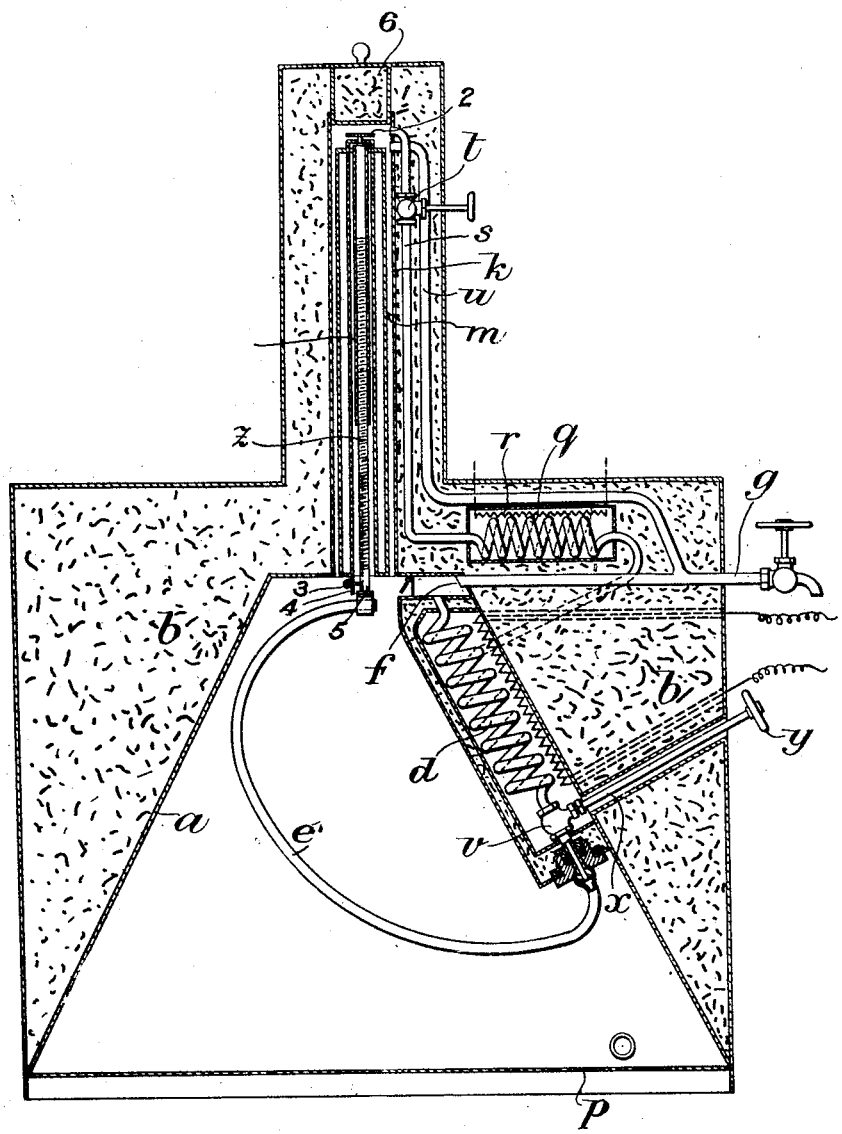

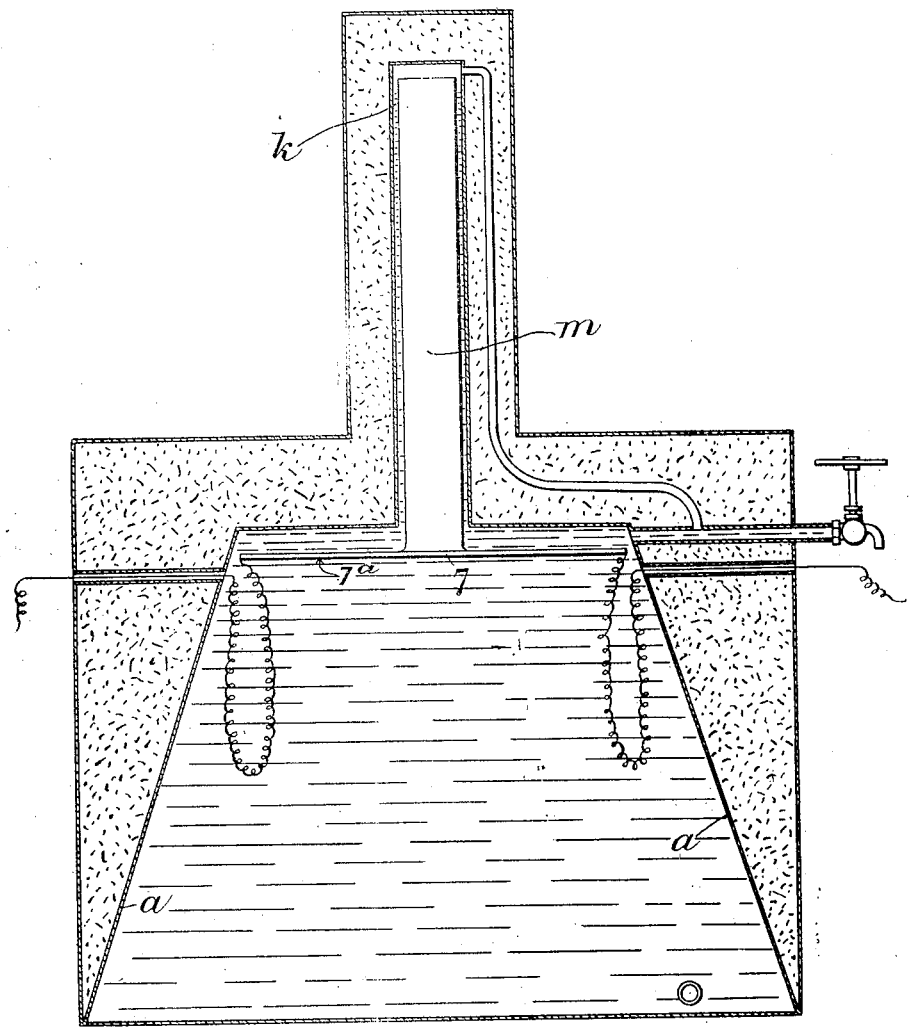

G. G. BELL.
METHOD OF AND MEANS FOR HEATING WATER AND OTHER MEDIUMS OR FLUIDS.
APPLICATION FILED JAN. 27, 1913.
1,101,243.
Patented June 23, 1914.
5 SHEETS—SHEET 4.
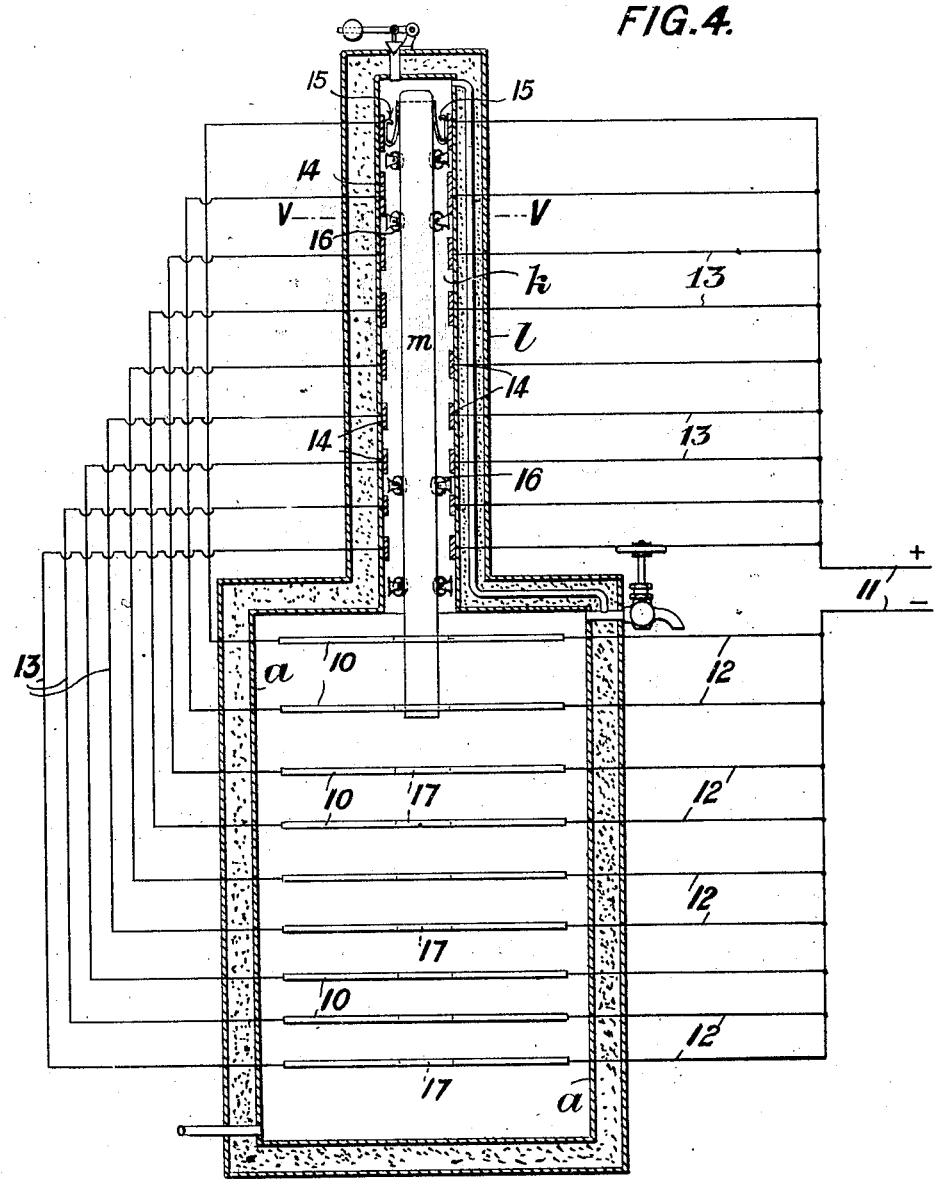
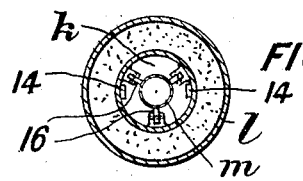
Witnesses:
B. N. Dommers
E. Leckert
Inventor.
George Gilbert Bell,
By ............... atty.

G. G. BELL.
METHOD OF AND MEANS FOR HEATING WATER AND OTHER MEDIUMS OR FLUIDS.
APPLICATION FILED JAN. 27.

1,101,243.

Patented June 23, 1914.

UNITED STATES PATENT OFFICE.

GEORGE GILBERT BELL, OF KENSINGTON, ENGLAND.

METHOD OF AND MEANS FOR HEATING WATER AND OTHER MEDIUMS OR FLUIDS.

1,101,243.  Specification of Letters Patent.  Patented June 23, 1914.

Application filed January 27, 1913. Serial No. 744,476.

*To all whom it may concern:*

Be it known that I, GEORGE GILBERT BELL, a subject of the King of Great Britain, and resident of 28 Addison Mansions, Kensington, in the county of Middlesex, England, have invented new and useful Improvements in the Method of and Means for Heating Water and other Mediums or Fluids, of which the following is a specification.

This invention relates to an improved method of and apparatus for heating or boiling water and other media or fluids by electricity, steam, coal, gas, oil or other means.

According to this invention a body of water or other fluid is heated from the top downward by applying heat to successive strata or layers of the water beginning at or near the top, the heating automatically transferred to a lower stratum whenever any given stratum is sufficiently heated.

The water or other medium is contained in an inclosed tank or receptacle preferably in communication with the source of supply, and heat is applied to the water or other medium by means of an electric heating resistance or coil or other appropriate heating means. The heating element is arranged so as to give a fairly uniform number of thermal units per hour and if this number of units be imparted to a certain quantity of water, the temperature of the latter will be raised a definite number of degrees, but whether it will raise it to the boiling point depends upon the initial temperature of the water. As the temperature of the water supply in town mains varies considerably the same number of thermal units which will produce boiling water in summer will fail to do so in the winter. Again the loss of heat due to radiation is also a variable quantity due to the variations in the temperature of the atmosphere, humidity and other causes, so that to always produce boiling water, either the number of heat units must be varied or the temperature of the water supplied to the heating element must be kept constant or the amount of radiating surface must be varied to suit the changing conditions. The water to be heated is suitably conveyed from the tank or receptacle to the lower end of the heater which is, preferably, mounted at some distance from the bottom of the tank so that the medium passes through or over the heating device and emerges at or near the top of the tank at the required temperature, whence it may be drawn off by an outlet or draw-off pipe for consumption. The water is consequently always coldest at the bottom but is gradually heated from the top toward the bottom.

The apparatus is preferably so constructed as to reduce to a minimum the heat loss due to radiation in the upper part of the apparatus, while permitting of such heat loss to a larger extent toward the bottom of the apparatus for the purpose of permitting the apparatus to be left untouched for any length of time without accident or inconvenience due to overheating. The effect obtained is that if only the upper strata or layers of water are hot, no appreciable loss of heat will ensue, but as heat is being constantly stored in the water, the time is reached when the whole of the water will be at or near boiling point, and as the radiating surface is suitably increased in area toward the bottom of the tank, the increase of heat loss, due to radiation, becomes greater so that if the electric current or heating device be left operating for some time without any water being drawn off, a point is reached when the heat losses will balance the heat added, with the result that no accident will happen, nor will sufficient steam be generated to force the water back to the supply tank, but the store of water at boiling or other suitable temperature will still be maintained and the efficiency of the apparatus at its normal working point will not be interfered with. The apparatus is also preferably so constructed that the volume of the upper stratum or layer of water in the tank is much smaller than that of any of the lower strata or layers, and preferably the tank is for this purpose so formed as to be of small dimensions at the top and largest at the bottom and moreover the heat insulating material is preferably thickest at the top and thinnest at the bottom to insure that the losses by radiation shall be least at the top where normally the water is hottest, the water at the bottom being heated only through the layers above it, and thus being of course much cooler than the strata or layers above, which increase in temperature, the nearer they are to the top.

The water may conveniently be introduced to the heater from the stratum or layer of water having a suitable temperature for heating, through an inlet the position of which is automatically regulated by providing, for example, a float in a float chamber in connection with the tank, such float chamber being normally filled with water, in which case the upper end of the float extends to the top of the float chamber. When, however, the temperature of the upper part of the body of water rises above boiling point, steam is produced and a certain amount of the water displaced thereby is forced back to the supply tank or elsewhere, the float falls with the water in the float chamber and means are provided in connection with the float for causing the inlet of the water to the heater to be lowered in the tank with the result that the water supplied to the heater comes from a lower and consequently cooler stratum or layer and the heated water delivered preferably at the upper end of the tank is of a lower temperature than that last delivered. By this means it is possible to maintain a uniform temperature of water in the layer or stratum ready to be discharged irrespective of the amount of heating energy consumed, although naturally the depth of such stratum or layer and consequently the bulk of such water varies according to the amount of heat supplied. In order to prevent the float from becoming unduly depressed owing to the accumulation of air in the float chamber, a pipe is employed which passes from the upper end of the float chamber to the draw-off pipe, so that as soon as the draw-off cock is opened any air in the float chamber passes away with the boiling or hot water at once, or the float chamber may be provided with an air valve which may be opened when required. Or the heating at the desired stratum or strata may be carried out automatically in any other convenient manner.

Where it is desired to use this system of heating for central heating purposes, in which case the temperature of the water may be lower than that of boiling water, for example 160° F., a subsidiary heating circuit is employed rising from, at or near where the water passes out from the upper end of the water coil heated as aforesaid and thence to the upper end of the float chamber, so that a small percentage only of the water passing through the primary heating circuit shall pass into this subsidiary circuit where it is heated before it reaches the upper end of the float chamber, the latter then being supplied from the subsidiary circuit with a small amount of boiling water producing steam, causing the float to descend bringing the inlet, connected to the float (and admitting water to the primary heating circuit), into a lower stratum or layer of cooler water and thereby increasing the bulk of water heated, but at a lower temperature and below that of boiling.

If desired and in the event of objection being taken to the use of water, (which may have been at boiling temperature for some time) for making tea or for other purposes, the apparatus may be provided in addition with a coil through which fresh water is passed as required and boiled by the heat supplied from the surrounding water in the tank through the wall of the coil.

Figure 1 of the accompanying drawings is a diagrammatic view of an apparatus constructed according to this invention, and Figs. 2, 3, 4 and 6 similarly represent other modifications and Fig. 5 is a section on the line V—V Fig. 4.

According to one construction, and as shown in Fig. 1, the tank $a$ which is suitably of prismatic or cylindrical shape, is provided with a jacket or lagging $b$ or other appropriate means for preventing loss of heat by radiation and convection and with an inlet pipe $c$ at the bottom in connection with a supply tank, cistern or other source of fluid supply. In the lagging or heat non-conducting material $b$ there is a space $e$ for the reception of a coil of pipe $d$ or the like which is to be heated by electricity or otherwise and the lower end of which coil is in connection by means of a flexible pipe connection $e^1$, made of or covered with heat insulating material, or by any other suitable connection, with the tank at a point between the upper and lower ends thereof. The lower end of the flexible pipe $e^1$ suitably fits on to a plug $e^2$ of metal or other appropriate material fitting into a flanged hollow plug $e^3$ of lignum vitæ or other heat non-conducting material. This hollow plug $e^3$ is also suitably screw-threaded externally to take a nut $e^4$ and a piece of packing $e^5$ is compressed in place by a gland $e^6$ to insure a watertight joint, or any other appropriate device may be employed. The upper end of the coil of pipe $d$ opens into a space or conduit $f$ connected on the one hand with the interior of the tank at the top thereof, and on the other hand with the outlet or delivery pipe $g$ from whence the supply of hot water or other medium is taken and assuming that the apparatus be used for obtaining hot water the coil of pipe is heated for example by an electric heating resistance or coil $h$ of known construction supplied with electric current. The space in the tank at the top into which the water coil opens is moreover provided with a non-return valve $i$ to the tank so that when water is drawn off, it cannot pass from the tank $a$ except through the heated coil of pipe $d$.

In the event of employing a float to regulate the position in the tank of the inlet to the coil, the tank has at the upper end a vertical hollow extension $k$ which is covered with a jacket $l$ of heat non-conducting material. This extension $k$ may be cylindrical or prismatic to form a float chamber and a float $m$ is put therein which float, when the float chamber is full of water, extends to the top of said chamber. The float may be guided in the float chamber in any suitable manner to obviate friction as much as possible. The lower end of the float (which is then about level with the top of the tank) has connected thereto the pipe $e^1$ which is flexible or jointed with an open end, while the other end of the pipe is connected to the heat insulated lower end of the coil of pipe $d$ which is heated by the electric heating resistance or coil $h$ as aforesaid. It is, however, obvious that the heating coil $d$ may be heated by a gas flame, a furnace or in any other convenient manner but preferably by some means which does not require much, if any, attention. The upper end of the float chamber $k$ is suitably provided with a safety valve $n$ to allow of the escape of steam above a determined pressure if necessary, and it is moreover preferably provided with a small pipe or conduit $o$ suitably inclosed within the jacketing or lagging $l$ and extending into the conduit $f$ leading to the draw-off or delivery pipe $g$ so that any air or steam which may be present in the top of the float chamber may escape when water is drawn off. In the event of the float $m$ being forced downward, owing to the presence of steam at the top of the float chamber $k$, say to the dotted position shown, it is obvious that the upper end of the pipe $e^1$ is also lowered into a cooler stratum of water from which the supply of water to the heating coil is to be taken.

The action is as follows: When the heating element $h$ is started by switching on the electric current, the whole of the water in the tank $a$ is at the same temperature say 40° F. The effect of starting the heating element is to raise the temperature of the water in the circulating coil $d$ and to cause the water to circulate. The heated water is delivered into the space or conduit $f$ and as long as water is not being drawn off, the heated water is delivered into the top of the tank $a$ past the non-return valve $i$. The float $m$ is in its highest position and consequently the open end of the flexible pipe $e^1$ is also close to the top of the tank. The heated water rises to the top of the float chamber $k$ until the whole of the water on a level with the flexible pipe inlet is raised to the same temperature, say 100°. The result is that now water at say 100° enters the flexible pipe $e^1$ to the circulatory system around or contiguous to the heater $h$, the result being that the water is delivered to the top of the tank at an even increased temperature, say 160° and presently the whole of the water in the upper stratum of the tank is raised at 160°, so that in circulating, water at 160° F. now enters the circulatory system, instead of at 100° F., and so on until water at, say 220° emerges from the heating coil $d$ and if this is the boiling point due to the fact that the whole of the water in the tank is under a slight pressure say 2 lbs. to the square inch, a little steam will be formed. Presently the whole of the water in the top of the tank and the float chamber will be raised to 220° F. and any addition to this temperature will only produce steam. Immediately this occurs, the steam collecting in the upper end of the float chamber $k$, depresses the water, some of which goes back to the supply tank by way of the pipe $c$ and obviously as the level of the water falls, the float $m$ assumes a lower position in relation to the tank $a$. As the area of the float chamber is small compared with the area of the tank, the inlet of the flexible pipe $e^1$ is lowered into a region or stratum of colder water so that no more steam is formed in the circulatory system and the position of the float remains as it is until the new stratum of water is also raised to boiling point whereupon more steam is formed and collects in the top of the float chamber $k$, the float sinks still farther bringing the inlet to pipe $e^1$ into another and cooler stratum of water with the same result as before. This process is repeated until a time is reached when the amount of boiling water is so large that appreciable losses of heat due to radiation begin to take place and these losses of heat equal the amount of heat transferred by the heating element so that the float remains practically motionless and just that amount of steam is maintained in the float chamber as is necessary to keep the float in such a position that the inlet to the flexible pipe $e^1$ is in the lower stratum of water so as to keep the whole bulk of water at the boiling point but obviously and as before described one does not have to wait for a supply of boiling water until the whole bulk approaches that temperature, enough for ordinary requirements being maintained at the top of the tank while the lower strata of water therein may be relatively cold.

When boiling water is drawn off the steam at the top of the tank is also released and given off at the discharge cock at $g$, cold water is admitted at the bottom to replace that drawn off, the float $m$ rises consequently the inlet to the flexible pipe $e^1$ is at the highest possible level and can only sink again after more steam is formed. The fresh water admitted and forming the lowest stratum in the tank is practically unaffected by the heating or at all events is not heated until such time as the strata of water above it have been heated or it is only heated by convection from the water above it. At the end of the day the apparatus may still be able to deliver boiling water if the demand has not been extraordinary even although the bulk of the water may be below the boiling point, while in the case of a tank heated in the usual way at the bottom there would then probably be luke-warm water forthcoming. Assuming that the supply of heat be continuous, it follows that in the morning or after a period when no hot water has been drawn off at all, the tank is full or nearly full of boiling water which is maintained more or less at that temperature according to the amount and the frequency of the withdrawals.

As shown in Fig. 2 the upper part of the tank $a$ is of much smaller dimensions than the lower part of the same, and the thickness of the heat non-conducting jacket $b$ is much greater at the top than at the lower end, while the bottom $p$ may be entirely uncovered or only thinly covered, so that a considerable amount of radiating surface is available, should the lower stratum of the water in the tank $a$ become heated to an undesirable degree. It is, however, obvious that if desired the tank $a$ may be cylindrical and the insulating material $b$ thicker near the top than it is at the bottom. On the other hand, however, a tank of this coned formation may be covered with a uniform thickness of insulating material, and a similar result is obtained due to increase of superficial area below. In the example shown, it is clear that the loss of heat due to radiation must be exceedingly small at the top but the losses increase as the bottom is approached, because the superficial area of the tank increases and the heat insulating material decreases in thickness toward the bottom. Owing to the coned shape of the tank $a$, the water forming a stratum of any given depth or thickness at the top of the tank is manifestly of much smaller volume than any similar stratum nearer the bottom. The result obtained is that a very small body of water is kept at boiling point near the top and when discharged at $g$ is easily replaced by a similar quantity of water heated in passing through the heating coil $d$.

If it be desired to use the apparatus for heating rooms and for supplying hot, but not boiling, water from a central point, the upper end of the water coil $d$ has connected thereto a coil of pipe $q$ provided with a heater of any suitable construction such as, for example, an electric heating resistance or coil $r$, and the other end of the pipe coil $q$ is connected by a pipe $s$ to the upper end of the float chamber $k$ with the result that if the temperature of the water delivered by the main coil to the coil $q$ and thence to the float chamber is raised to boiling point, steam is produced, thereby displacing water in the float chamber causing the float $m$ to sink and to cause the open end of the flexible or jointed pipe $e^1$ to sink to a lower and cooler stratum of water in the tank $a$, thereby increasing the bulk of water heated and allowing for circulation of warm water through a system of piping in the house or other place, and in order that the passage of water or steam through the subsidiary circuit may be regulated according to the temperature required in the storage tank there is a cock or valve $t$ for example in the delivery pipe $s$. The primary circuit $e^1 d$ may also have a valve or cock $v$ operated by a spindle $x$ and handle $y$ for regulating the circulation or flow of the medium to be heated and the relative positions of the float $m$ and the flexible or jointed pipe $e^1$ leading to the coil $d$ in or surrounding the primary heater may be adjusted or regulated by a screw $z$ working in a long nut 1 adapted to be rotated in the hollow float $m$ by a milled head 2, the screw $z$ being allowed to move in the direction of its axis but not to rotate by means of a screw or stud 3 fixed in a lug 4 on the float and projecting into a longitudinal groove 5 in the screw. The float chamber is suitably provided with a removable plug 6 which on removal permits of regulating the screw $z$.

In another construction, as shown in Fig. 3, the flexible pipe $e^1$ and outside heating coil $d$ are dispensed with and an electrically heated plate 7, the under surface of which is preferably covered with heat insulating material $7^a$, is fixed to the lower end of the float $m$. The plate 7 is heated by means of an electric current with the result that the water above the plate is heated and ultimately boils. Steam consequently collects in the upper part of the float chamber $k$ and the float with the plate sinks further in the tank thus bringing a larger volume of water above the plate. Ultimately this new volume of water is raised to boiling point, more steam is generated and the plate further sinks until the whole of the contents of the tank $a$ are at boiling point. By this means when starting the apparatus the hot plate never has more than a thin film of water above it which can be readily heated to boiling point and any material addition to that volume of hot water can only be produced by the sinking of the float whereby the plate is caused to sink into a lower stratum of cooler water and raises the temperature therein.

Another construction shown in Figs. 4 and 5 comprises several electrically heated hot plates 10 fixedly arranged one above the other in the tank $a$. These plates on the one hand are connected directly to one of the electric mains 11 through connections 12 and on the other hand are adapted to be connected with the other of said mains through connections 13, pairs of switch contacts 14 arranged on the inside of the float chamber $k$, and electrically connected switch contacts 15 on the upper end of the float $m$. When the float $m$ is in its initial position as shown with the uppermost pair of contacts 14 in engagement with the contacts 15 the uppermost plate 10 is in circuit and the upper stratum of water is being heated. When the water in this stratum boils, and steam collects in the upper part of the float chamber the level of the water will be lowered in the float chamber so that the float will descend and eventually move the contacts 15 out of engagement with the uppermost pair of contacts 14 and into engagement with the next pair of contacts 14, thus closing the circuit of the second plate 10. The movable contacts 15 are suitably of a length slightly greater than the vertical distance between adjacent pairs of contacts 14, so that the contacts 15 come into engagement with the next lowest pair of contacts 14 before leaving the contacts 14 just above. The float in descending closes the circuits of the plates 10, successively proceeding downward, so that the water becomes heated stratum by stratum from above downward. The float m is suitably guided in its movements by rollers 16 arranged around the float on the inside of the float chamber as shown clearly in Fig. 5, and the plates 10 are centrally perforated as at 17 for the passage of the float when descending or ascending. When hot water is drawn off through the pipe f and tap g, steam and air escape from the upper end of the float chamber k, and the float m ascends say, to its normal or initial position. The successive switching of the current from one plate 10 to the next plate may however be carried out by means of a thermometer or thermometers operating to close the circuits of successive plates as the temperature rises and falls in the fluid space of the tank, or the control of the heating of the plates may be carried out in any other convenient manner whether it be by electrical or other means.

Referring to Fig. 6, it will be seen that the tank a is cylindrical and the jacket b of bad heat conducting material is thicker at the top than at the bottom so as to reduce the radiation of heat at or near the top to a minimum, while allowing of a greater heat loss toward the bottom, but it is obvious that the tank a may also be made conical, that is of smaller diameter at the top and larger at the bottom. Moreover this particular construction of apparatus is shown provided with an additional coil, illustrated diagrammatically by a zig-zag tube 8 but in practice it would be made small in diameter and in the form of a helix with convolutions as close together as possible so as to provide the greatest superficial area for the heating of the water therein contained, by contact with the bulk of water in the tank a. The water enters the coil 8 at the bottom passes up around and around the tank and is drawn off at the top by the cock 9 so that fresh water, either hot or boiling, may be obtained for drinking purposes, making tea and the like. Moreover it is obvious that the upper end of the coil may be situated in the float chamber, where the water is hottest.

I claim:—

1. The method of heating a body of fluid from the top downward, consisting in heating the fluid by successive layers beginning approximately at the top and automatically transferring the heat to a lower layer whenever any given layer is sufficiently heated.

2. The method of heating a body of fluid from the top downward, which comprises heating the fluid by successive layers beginning approximately at the top, circulating the fluid past a source of heat from a layer and delivering fluid from said layer on top of the body of fluid.

3. The method of heating a body of water from the top downward, which comprises forcing the body of water downward by steam on the surface thereof and circulating water from below the steam space past a source of heat and into the steam space, and automatically shifting the circulation from a higher to a lower level, in accordance with the volume of steam.

4. The method of heating a body of fluid, which comprises heating the fluid by successive layers beginning substantially at the top, automatically transferring the heat to a lower layer whenever any given layer is sufficiently heated, and controlling the heating rate by the volume of the layers.

5. The method of heating a body of fluid, which comprises heating a body of fluid in successively lower layers, automatically transferring the heating to a lower layer when any given layer has been sufficiently heated, and controlling the rate of heating by varying both the volume of the layers and the radiation from the fluid.

6. The method of heating a body of fluid, which comprises heating a body of fluid in successive layers, automatically transferring the heat to a lower layer when any given layer is sufficiently hot, and decreasing the rate of heating from the top downward.

7. The method of heating a body of fluid, which comprises heating a body of fluid in successive layers, automatically transferring the heating to a lower layer when any given layer is sufficiently hot, and decreasing the rate of heating from the top downward by an increasing volume of the layers as well as a decreasing insulation from the top downward.

8. In a heater for fluids, the combination of a fluid container, heating means for the fluid, and automatic controlling means operating to bring a lower layer of fluid under the influence of the heating means whenever any given layer is sufficiently heated.

9. In a heater for fluids, the combination of a fluid container, heating means for the fluid and a float operating to bring a lower layer of fluid under the influence of the heating means whenever any given layer is sufficiently heated, substantially as set forth.

10. In a heater for fluids, the combination of a fluid container, heating means for the fluid, a float chamber connected with said container and a float in said chamber operating to bring a lower layer of fluid under the influence of the heating means whenever any given layer is sufficiently heated, substantially as set forth.

11. In a heater for fluids, the combination of a fluid container, a heating device for the fluid, an inlet to said heating device adjustable as to height in said container, an outlet from said heating device leading back to said container, and automatic means for adjusting the position of said inlet to cause fluid from a lower layer to pass therethrough to said heating device whenever any given layer is sufficiently heated, substantially as set forth.

12. In a heater for fluids, the combination of a fluid container, a heating device for the fluid, an adjustable inlet connection leading from said container to said heating device, an outlet leading from said heating device back to said container, and automatic means for adjusting said inlet connection to cause fluid from a lower layer to pass therethrough to said heating device whenever any given layer is sufficiently heated, substantially as set forth.

13. In a heater for fluids, the combination of a fluid container, a heating device for the fluid, an adjustable inlet connection leading from said container to one end of the heating device, an outlet connection leading from the other end of said heating device to the top of the container, and automatic means for adjusting said inlet connection so as to cause fluid from a lower layer to pass therethrough to said heating device whenever any given layer is sufficiently heated, substantially as set forth.

14. In a heater for fluids, the combination of a fluid container, a heating device for the fluid, a flexible connection leading from said container to said heating device, an outlet leading from said heating device to the top of said container, and automatic means for adjusting said connection so as to cause fluid from a lower layer to pass therethrough to said heating device whenever any given layer is sufficiently heated, substantially as set forth.

15. In a heater for fluids, the combination of a fluid container, a heating device for the fluid, a flexible heat-insulated connection leading from said container to said heating device, an outlet leading from said heating device to the top of the container, and automatic means for adjusting said connection so as to cause fluid from a lower layer to pass therethrough to said heating device whenever any given layer is sufficiently heated, substantially as set forth.

16. In a heater for fluids, the combination of a fluid container, a heating device for the fluid, a jointed heat-insulated connection leading from said container to said heating device, an outlet leading from said heating device to the top of said container, and automatic means for adjusting the said connection to cause fluid from a lower layer to pass therethrough to said heating device whenever any given layer is sufficiently heated, substantially as set forth.

17. In a heater for fluids, the combination of a fluid container, a heating device for the fluid, a flexible heat-insulated pipe leading from said container to said heating device, a heat non-conducting connection between said flexible pipe and said heating device, an outlet leading from said heating device to the top of said container and automatic means for adjusting the position of said pipe to cause fluid from a lower layer to pass therethrough to said heating device whenever any given layer is sufficiently heated, substantially as set forth.

18. In a heater for fluids, the combination of a fluid container, a heating device for the fluid, an adjustable inlet connection leading to said heating device from said container, automatic means for adjusting said inlet connection to cause fluid from a lower layer to pass therethrough whenever any given layer is sufficiently heated, an outlet connection leading from said heating device to said container, a draw-off outlet from the fluid container, and a valve arranged in said outlet connection for allowing only such fluid to pass through said draw-off outlet as has passed through the heating device, substantially as described.

19. In a heater for fluids, the combination of a fluid container, automatically controlled means for heating the fluid by successive layers from the top downward, and a heat-insulating cover for said container, said cover being thicker at the top of said container than toward the bottom thereof, substantially as and for the purpose set forth.

20. In a heater for fluids, the combination of a fluid container and automatically controlled heating means adapted to heat the fluid layer by layer from the top downward, said container tapering toward the top so as to be narrow at the top and wider at the bottom, substantially as set forth.

21. In a heater for fluids, the combination of a fluid container, a heating device for the fluid, an inlet connection leading to said heating device from said container, an outlet connection leading from said heating device to said container, a float chamber connected with said container, and a float in said float chamber, said float being connected with said inlet connection and being adapted to adjust same so as to cause fluid from a lower layer to pass into such inlet connection and through the heating device whenever any given layer is sufficiently heated, substantially as set forth.

22. In a heater for fluids, the combination of a fluid container, heating means for the fluid, a float chamber connected with said container, a float in said chamber and adapted to automatically cause the heating means to heat the fluid by successive layers from the top downward, a draw-off pipe leading from said container, and a release pipe leading from the upper end of said float chamber to said draw-off pipe for allowing the escape of the air and steam present in the float chamber when hot water is drawn off, substantially as set forth.

23. In a heater for fluids, the combination of a fluid container, a main heating device for the fluid, inlet and outlet connections between said main heating device and said fluid container, a float chamber connected with said container, a float in said chamber and adapted to adjust said inlet connection so as to cause a lower layer of fluid to pass to the main heating device whenever any given layer is sufficiently heated, a subsidiary heating device, and connections between said subsidiary heating device and said main heating device and between said subsidiary heating device and the upper end of said float chamber, substantially as and for the purpose set forth.

24. In a heater for fluids, the combination of a fluid container, automatically controlled heating means for heating the fluid by successive layers from the top downward, and a coil submerged in the fluid in said container for supplying quantities of fresh hot water, substantially as set forth.

25. In a heater for fluids, the combination of a fluid container, means for heating the fluid, a fluid inlet at the bottom of said container, a fluid-outlet at the top of said container, a float chamber connected with said container and a float in said chamber adapted when fluid is expelled from said container through said fluid inlet and the level of the fluid falls in the float chamber owing to the presence of vapor in the float chamber, to descend and thus bring a lower layer of fluid under the influence of the heating means, substantially as set forth.

GEORGE GILBERT BELL.

Witnesses:
JOHN H. STOUDWICK,
H. D. JAMESON.